(No Model.) 3 Sheets—Sheet 1.
F. METZNER.
COOKING AND HEATING STOVE.
No. 268,921. Fig. 1. Patented Dec. 12, 1882.
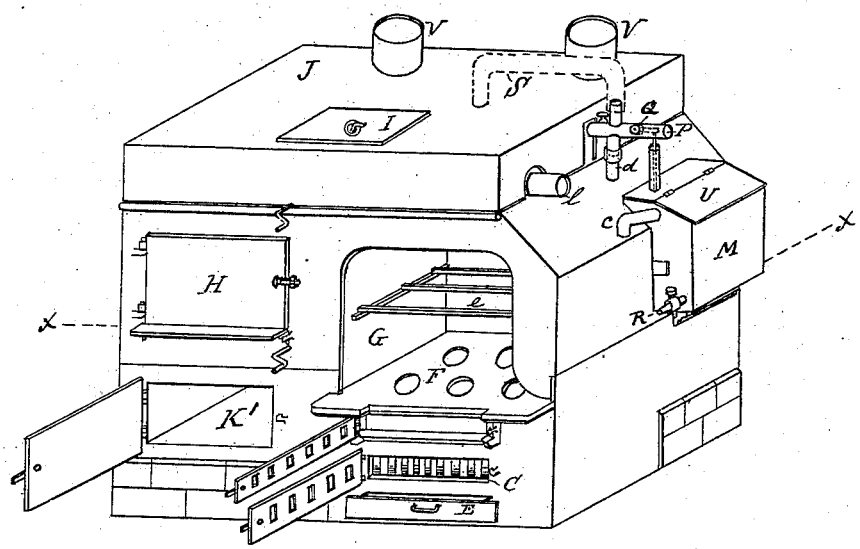
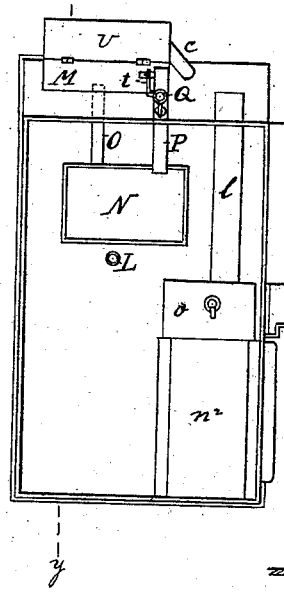
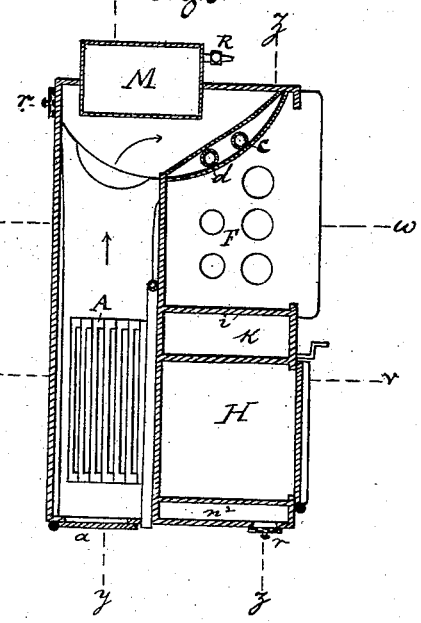
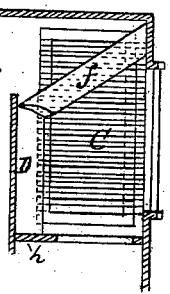
Witnesses:
G. Huzel.
H. Huchl.
Inventor.
Frank Metzner
By Wm H Lotz
Attorney
N. PETERS, Photo-Lithographer, Washington, D. C.

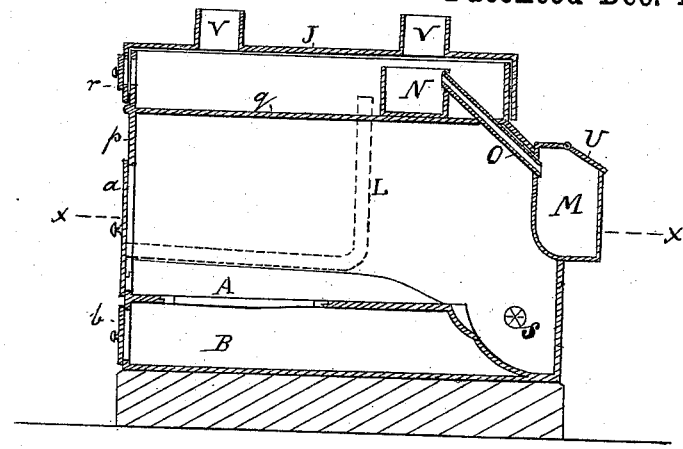
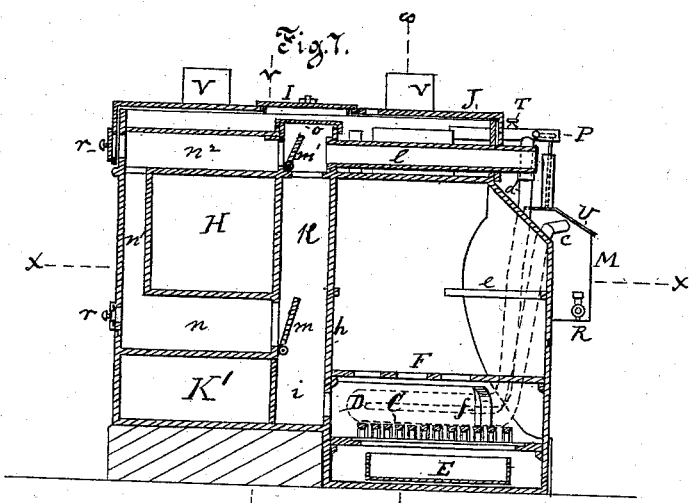
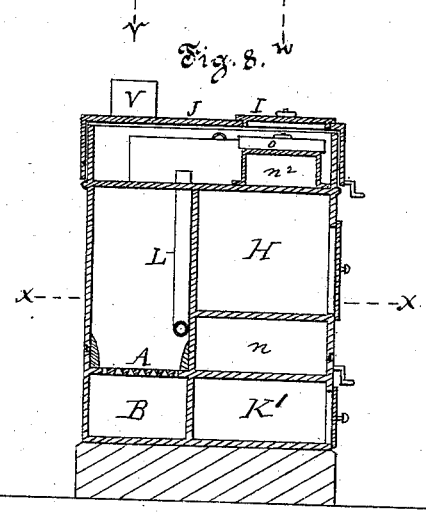

(No Model.) 3 Sheets—Sheet 3.

F. METZNER.
COOKING AND HEATING STOVE.

No. 268,921. Patented Dec. 12, 1882.

Witnesses:
G. Huzel
H. Huehl

Inventor.
Frank Metzner
By Wm H Lotz
Attorney.

UNITED STATES PATENT OFFICE.

FRANK METZNER, OF CHICAGO, ILLINOIS.

COOKING AND HEATING STOVE.

SPECIFICATION forming part of Letters Patent No. 268,921, dated December 12, 1882.

Application filed September 11, 1882. (No model.)

*To all whom it may concern:*

Be it known that I, FRANK METZNER, of Chicago, in the county of Cook and State of Illinois, have invented certain new and useful Improvements in Cooking and Heating Stoves; and I do hereby declare that the following is a full, clear, and exact description thereof, reference being had to the accompanying drawings, and to the letters of reference marked thereon, which form a part of this specification.

This invention relates to ranges and cooking-stoves that at the same time are used as heating-stoves; and it is my object to construct such a range that has two fire-places—one for summer and the other one for winter use.

Figure 9:
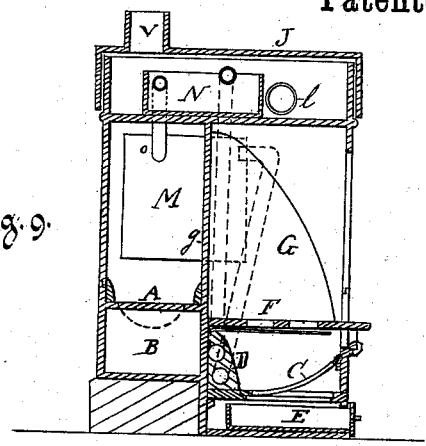
Figure 10:
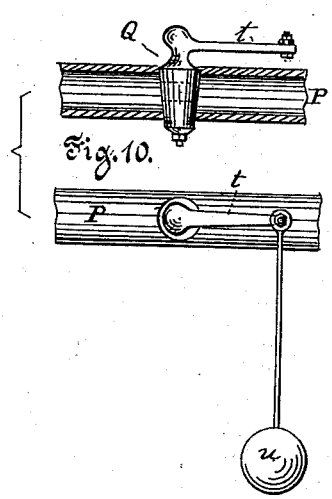
Figure 11:
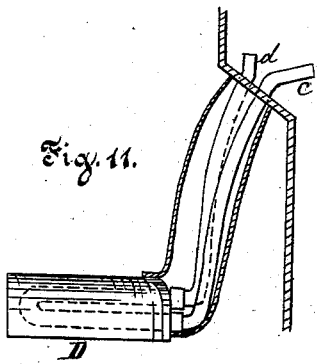
Figure 12:

In the accompanying drawings, Figure 1 represents a perspective view of my improved range and heating-stove. Fig. 2 is a plan view of my improved range and heating-stove with the top plate removed; Fig. 3, a sectional plan on line $x\ x$; Fig. 4, a plan of the lower or summer grate; Fig. 5, a plan of the top cover to the smoke-flue; Fig. 6, a longitudinal vertical section of the range on line $y\ y$; Fig. 7, a similar section on line $z\ z$; Fig. 8, a vertical cross-section on line $v\ v$; Fig. 9, a similar section on line $w\ w$; Fig. 10, a longitudinal section and side elevation of the automatic water-supply valve; Fig. 11, a detached view of the water-back and circulating-pipes, and Fig. 12 an elevation and section of the reflector-plate.

Corresponding letters in the several figures of the drawings designate like parts.

A denotes the grate for winter use; $a$, the fuel-door; B, the ash-pit, and $b$ the door for same.

C is the grate for summer use, which is made somewhat of the shape of a common fire-place grate, and is removable, to be taken out in the winter time. To the rear of this grate C is placed a water-back, D, which has circulating-pipes $c$ and $d$, and over such grate is placed diagonally the reflector-plate $f$, which forms a partition between plate F and grate C.

E is the ash-pit under grate C, made in the shape of a drawer; and F is the cooking-plate, having a series of round openings for inserting the cooking-vessels; and above this plate F is formed a large chamber, G, that has a grate-shelf, upon which the viands are placed for keeping them warm.

H is an oven for baking.

In the winter time the grate C and reflector-plate $f$ are removed, and fire is kindled upon grate A, when the gases are directed by the partition $g$ to rearward, will thence turn and pass under the cooking-plate F, thence through an opening in partition $h$ into flue $i$, whence the gases may either pass direct through flue $k$ into and through smoke-flue $l$, or when closing the valves $m$ and $m'$, by means of their exterior cranks, the gases will be directed to pass through flues $m\ n'\ n^2$ around the bake-oven H.

For summer use the grate C and reflector-plate $f$ are inserted, when the heat of the fire on such grate is more confined in such stove, and the gases have a much shorter distance to travel. A cap, $o$, will close the top of flue K, which, when removed, gives admittance to the valves $m$ and $m'$. This cap $o$ can be reached through an opening in top plate, J, of the stove that is closed by a cover, I.

K' is a chamber for warming plates or for keeping viands warm.

An elbow-pipe, L, is placed through the stove, one end of which reaches through the end wall, $p$, and the other end through the upper plate, $q$, for admitting a current of fresh air into the chamber between plates $q$ and J, which air, after being heated, will escape through nozzles V into the kitchen, or it may be conducted through a pipe into another room to be heated.

Vents $r$ are for cleaning the flues, and register $s$ for admitting air into the combustion-chamber.

M is a water-vessel, attached to the rear of the furnace; and N another water-vessel, placed in the chamber between plates $q$ and J, and vessels M and N communicate through a pipe, O.

P is the water-supply pipe that leads into the vessel N, and to which is coupled the pipe $d$ of the water-back D, while the pipe $c$ connects with the vessel M. The pipe P has a valve, Q, that has a crank, to which is suspended a float, $u$, that extends into the vessel N, for regulating the supply of water to keep the vessels filled to a certain point.

R is a faucet for drawing off hot water from vessel M as it is required.

The vessel N, after being nearly filled with water, will discharge into vessel M through pipe O, and as soon as the water rises to a certain height in vessel M the float $u$ will shut off the supply and will open again the valve Q automatically for a fresh supply proportionally as the water is used. The water will circulate through the pipes $c$ and $d$ and through the water-back, and will become heated. At any time when desirable to shut off the connection with the supply-pipe P by closing the faucet T a pipe, S, is coupled to the pipe P, which leads to vessel N for discharging into such vessel N the steam generated in the water-back, while vessel M is then to be filled through an opening that is closed by its hermetically-fitting lid U.

In this stove, as will be noticed, every important object is attained. In the winter time the waste heat is made useful for heating purposes, and in the summer time the stove can radiate but very little heat, since the heated surfaces are inclosed. Besides that, this stove gives facilities for cooking, baking, and warming, and for heating water. The evaporation of the water in tank N will mix with the heated air that escapes through nozzles V, and thus will impregnate such air with sufficient moisture to make it healthful to be breathed.

The lower end of pipe L can be extended through the wall of the building to draw in fresh air from out-doors that is to be heated.

I am aware that ranges have been constructed with auxiliary fire-pots and ash-pits, and that other ranges have been constructed with a plate at the rear of the combustion-chamber, for the purpose of contracting the space therein, and provided at either end with a plate for deflecting the currents of heated air, and such I do not claim.

What I claim is—

1. In a range, the grate A and ash-pit B, in combination with the auxiliary removable grate C, and the removable reflector-plate $f$, arranged above and diagonally across said grate C, and forming a partition between said grate C and the cooking-plate F, substantially as and for the purpose set forth.

2. In a range, the longitudinal partition $g$, transverse partition $i$, and horizontal partition $q$, the top plate, J, with air-nozzles V, grate A, with ash-pit B, cooking-plate F, with auxiliary grate C, and removable reflector-plate $f$, the whole being constructed, combined, and arranged substantially as and for the purpose set forth.

3. In a range, the grate A, cooking-plate F, flues $i$, K, $n$, $n'$, $n^2$, and $l$, with valves $m$ and $m'$, chamber G, bake-oven H, and chamber K', in combination with the auxiliary grate C and removable reflector-plate $f$, all substantially as and for the purpose set forth.

4. In a range, substantially as described, and in combination with the grate C, the water-back D, pipes $c$ and $d$, water-vessels M and N, connecting-pipe O, and water-supply pipe P, with float-valves Q, all arranged as set forth.

In testimony that I claim the foregoing as my invention I affix my signature in presence of two witnesses.

FRANK METZNER.

Witnesses:
G. HAZEL,
R. G. SCHMID.